United States Patent
Gensler et al.

(10) Patent No.: US 7,813,844 B2
(45) Date of Patent: Oct. 12, 2010

(54) DEVICE FOR BRINGING A MOTOR VEHICLE TO A TARGET POSITION

(75) Inventors: Frank Gensler, Neubiberg (DE); Dirk Ehmanns, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 329 days.

(21) Appl. No.: 11/889,050

(22) Filed: Aug. 8, 2007

(65) Prior Publication Data
US 2008/0033603 A1 Feb. 7, 2008

Related U.S. Application Data

(63) Continuation of application No. PCT/EP2005/001682, filed on Feb. 18, 2005.

(51) Int. Cl.
B60Q 1/48 (2006.01)
(52) U.S. Cl. .......................................... 701/1; 348/113
(58) Field of Classification Search ...................... 701/1, 701/41, 36, 45, 224, 300–302; 180/204, 180/271, 280, 282; 348/113, 116, 119, 143, 348/148
See application file for complete search history.

(56) References Cited

U.S. PATENT DOCUMENTS 5,938,710 A * 8/1999 Lanza et al. ................... 701/50
5,945,907 A * 8/1999 Yaron et al. .................. 340/436
6,446,998 B1 * 9/2002 Koenig et al. ................ 280/432
6,564,123 B2 5/2003 Hahn et al.
6,654,670 B2 * 11/2003 Kakinami et al. ............... 701/1
7,024,286 B2 * 4/2006 Kimura et al. .................. 701/1
7,369,940 B2 * 5/2008 Frank et al. .................. 701/300

FOREIGN PATENT DOCUMENTS

| DE | 10 2004 007 850 A1 | 9/2004 |
| EP | 1 249 379 A2 | 10/2002 |
| FR | 2 554 612 A1 | 5/1985 |

OTHER PUBLICATIONS

International Search Report dated Jun. 8, 2005 with an English translation of the pertinent portions (Four (4) pages).
Corresponding International Preliminary Report on Patentability (Form PCT/IB/373), along with Form PCT/IB/338 (Two (2) pages).
Corresponding Written Opinion of the International Searching Authority (Form PCT/ISA/237) (Six (6) pages).

* cited by examiner

Primary Examiner—Dalena Tran
(74) Attorney, Agent, or Firm—Crowell & Moring LLP

(57) ABSTRACT

In the case of a system for automatically bringing a motor vehicle into a target position, having a sensor system and an analyzing unit for determining the position of the motor vehicle relative to the target position as well as devices for planning a collision-free drive from the current position to the target position, and devices for implementing the planned drive, a first part of the sensor system is arranged at or in the motor vehicle, and a second part of the sensor system is arranged in a stationary manner in a defined position close to the target position.

20 Claims, 2 Drawing Sheets

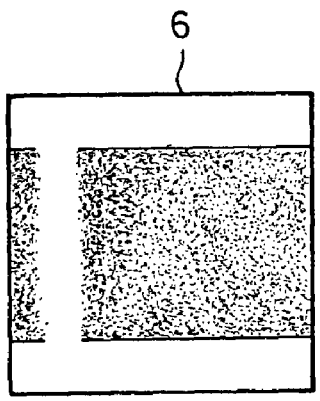
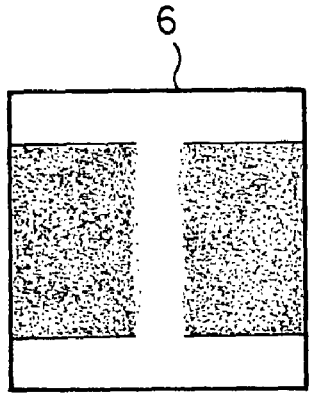
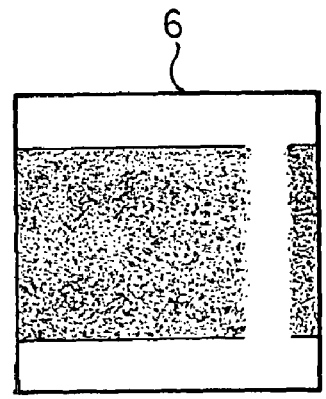
Fig. 3a Fig. 3b Fig. 3c
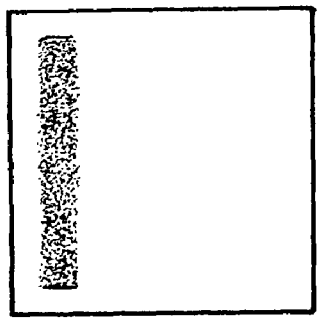
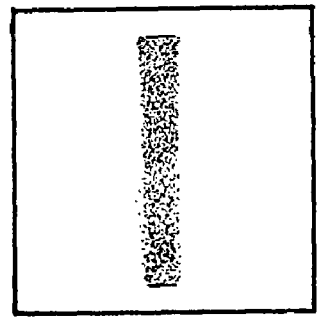
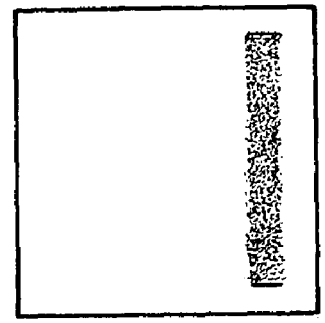
Fig. 4a Fig. 4b Fig. 4c

DEVICE FOR BRINGING A MOTOR
VEHICLE TO A TARGET POSITION

CROSS REFERENCE TO RELATED
APPLICATIONS

This application is a continuation of PCT International Application No. PCT/EP2005/001682, filed Feb. 18, 2005, the entire disclosure of which is herein expressly incorporated by reference.

BACKGROUND AND SUMMARY OF THE INVENTION

The present invention relates to a system for automatically bringing a motor vehicle into a target position, having a sensor system and an analyzing unit for determining the position of the motor vehicle relative to the target position as well as devices for planning a collision-free drive from the current position to the target position and devices for implementing the planned drive.

A method of bringing a motor vehicle into a target position is known from European Patent Document EP 1 249 379 A2, by which the motor vehicle is brought into a starting position close to the endeavored target position. After a first driver-side activation, the environment of the motor vehicle is continuously scanned at least for the detection of the target position, and the current vehicle position is continuously determined. Based on the determined environmental and position information, control information is determined for bringing the motor vehicle into the target position. After a second driver-side activation, control commands dependent on the control information are emitted to the transmission line and/or the braking system and/or the steering system of the motor vehicle, whereby the motor vehicle drives into the target position independently of the driver.

Such a process is typically triggered by one or more operating actions of an operator situated outside the motor vehicle.

The method known from European Patent Document EP 1 249 379 A2 is suitable for bringing a motor vehicle into various target positions, such as normal parking spaces. This ambitious objective implies that the method should also be usable in unstructured environments, i.e., environments having only natural landmarks. For this purpose, high technical expenditures on the part of the motor vehicle are required for detecting the environment of the motor vehicle and the own position.

It is an object of the present invention to provide a system which permits automatic park-in and/or park-out operations and requires low technical expenditures on the part of the motor vehicle.

According to the invention, this object is achieved by a system for automatically bringing a motor vehicle into a target position, having a sensor system and an analyzing unit for determining the position of the motor vehicle relative to the target position as well as devices for planning a collision-free drive from the current position to the target position and devices for implementing the planned drive, wherein a first part of the sensor system is arranged at or in the motor vehicle, and a second part of the sensor system is arranged in a stationary manner in a defined position close to the target position.

Typically, motor vehicles are repeatedly parked in or out at one of very few target positions. Particularly, parking operations are frequently repeated with respect to a single target position, for example, the vehicle holder's garage at home.

According to the invention, by means of the stationary arrangement of the second part of the sensor system in a defined position, the target position or at least an object situated in a stationary manner close to the target position (e.g., the wall of a garage) is prepared for parking operations such that the motor-vehicle-side technical expenditures required for permitting a method of automatically bringing a motor vehicle into a target position can be reduced considerably. As a result of the preparation of the target position or of the at least one object situated in a stationary manner close to the target position, a structured environment is created for the parking operation to be carried out automatically.

A first advantage of a system according to the invention is that technical motor-vehicle-side expenditures are reduced compared to a method according to the state of the art in that the equipment-related expenditures on the part of the motor vehicle are reduced. This advantage may concern the sensor system to be provided on the part of the motor vehicle as well as the computing capacity of an arithmetic-logic unit to be provided on the part of the motor vehicle.

A second advantage of a system according to the invention consists of the fact that the computing expenditures required for implementing a method for automatically bringing a motor vehicle into a target position are reduced and/or the precision and/or robustness of such a method can be increased.

According to a further development of the invention, by means of the sensor system contained in a system according to the invention, at least a horizontal angle between a reference axis of the first or second part of the sensor system and a connection axis between a reference point of the first part and a reference point of the second part of the sensor system can be determined.

This clearly distinguishes a system according to the invention from known park-in aids for garage parking spaces, in the case of which at least one part of a sensor system (e.g., for the ultrasonic ranging) is arranged in a stationary manner close to a target position. As a rule, such systems detect only the distance of a motor vehicle from the target position and thus only a small portion of the measurable quantities required for the implementation of automatic pin-in and/or park-out operations. In addition, in contrast to a system according to the invention, such systems are typically exclusively provided for supporting the driver, for example, by means of acoustic or visual information, during parking operations, in which the motor vehicle is operated by the driver.

According to a first exemplary embodiment of the invention, the first part of the sensor system is arranged in a defined spatial location with respect to the motor vehicle, and the sensor system and the analyzing unit are suitable for determining the horizontal angle between a reference axis of the first part of the sensor system, particularly the longitudinal axis of the vehicle, and a connection axis between a reference point of the first part and a reference point of the second part of the sensor system.

The angle set between the reference axis of the first part of the sensor system and the above-mentioned connection axis, if the axes and reference points are correspondingly defined and analyzed, will supply information as to the direction in which the target position is situated with respect to the motor vehicle.

According to a second exemplary embodiment of the invention, the second part of the sensor system is arranged in a defined spatial location with respect to the target position, and the sensor system and the analyzing unit are suitable for determining the horizontal angle between a reference axis of the second part of the sensor system, particular of a center axis of the garage, and connection axis between a reference point of the first part of the sensor system and a reference point of the second part.

The angle set between the reference axis of the second part of the sensor system and the above-mentioned connection axis, if the axes and reference points are correspondingly defined and analyzed, will supply information as to the direction in which motor vehicle is situated with respect to the target position.

According to a third exemplary embodiment of the invention, the sensor system and the analyzing unit are suitable for determining the distance between a reference point of the first part and a reference point of the second part of the system.

If the reference points are correspondingly defined and analyzed, the distance between the current motor vehicle position and the target position can be derived therefrom.

According to an exemplary embodiment of the present invention, the second part of the sensor system includes at least one so-called artificial landmark. In the industry, artificial landmarks are normally used for preparing the usage environment of autonomous mobile systems, such as driverless transport systems (FTS), in a targeted manner in the production. Their use in connection with motor vehicles has been less widespread. Artificial landmarks are typically mounted in a defined spatial location and/or location, and the sensors of an autonomous system can recognize them in a simple and reliable manner. Artificial landmarks can correspond with sensors of different operating principles, for example, visually and/or acoustically and/or inductively and/or magnetically. They may each have an active or passive design.

Using several landmarks, the position and location of the first part of the sensor system with respect to the second part, that is, the position and location of the motor vehicle with respect to the target position, can be determined in a manner known per se, for example, by triangulation. Such determination methods are known and are based on different measuring principles, for example, visual and/or acoustic and/or inductive and/or magnetic principles.

According to another exemplary embodiment of the present invention, a structured environment is provided for the parking operation to be carried out automatically in that exactly one artificial landmark is mounted in a stationary manner close to the target position.

In order to permit the simple and reliable determination of as many of the above-mentioned quantities as possible, the artificial landmark has to meet certain requirements. According to an exemplary embodiment of the present invention, a passive visual artificial landmark is used which is such that it is suitable for the direction-dependent reflection of incident light.

The passive visual artificial landmark may be designed and/or is spatially arranged such that it is suitable for the horizontally variable reflection of incident light. For this purpose, reflectors are suitable which are based, for example, on lamellae, particularly lamellae of a variable adjusting angle. As an alternative, the use of at least one so-called lenticular image—in colloquial language, also called a wobble image—is conceivable as a passive visual artificial landmark with horizontally variable reflection characteristics or as a part thereof.

According to an exemplary embodiment of the present invention, the second part of the sensor system includes a camera. Analogously, the analyzing unit essentially corresponds to an image processing unit. According to an exemplary embodiment of the present invention, a camera contained in a system according to the invention can be used by at least one other functionality of the motor vehicle. If the camera is used for the implementation of one or more functionalities of the motor vehicle, only very low equipment costs will arise on the part of the motor vehicle for the implementation of a system according to the invention.

In a system according to the last-mentioned embodiment of the invention, the following identification steps can be carried out in a manner known per se:

Identification of the landmark in the camera picture by means of its shape (for example, square or rectangular with a defined height-width ratio);

determination of the distance between a reference point of the camera and a reference point of the landmark from the reduction ratio of the image of the landmark in the taken camera picture;

determination of the horizontal angle between the camera axis or longitudinal vehicle axis and the connection axis between a reference point of the camera and a reference point of the landmark by means of the position of the center of mass of the image of the landmark in the taken camera picture;

determination of the horizontal angle between a reference axis of the landmark, such as a center axis of a garage, and the connection axis between a reference point of the camera and a reference point of the landmark by means of characteristics, particularly brightness characteristics, of the image of the landmark in the taken camera picture.

In particular, the last identification step is very much dependent on the nature of the selected landmark. According to an advantageous embodiment of the present invention, the nature of the landmark is such that, as a result of its direction-dependent reflection behavior, a course of brightness within the image of the landmark occurs which depends on the angle of view. In the case of a horizontally variable reflection behavior of the landmark, such a course of brightness depends particularly on the horizontal angle of view.

According to an exemplary embodiment of the present invention, the nature of the landmark is such that, in the case of corresponding lighting conditions, within the image of the landmark in the taken camera picture, at least one easily detectable area having essentially the shape of a vertically extending bar occurs, which area has a brightness which differs from the brightness of the surrounding areas. The lateral position of such a vertical bar within the image of the landmark in the taken camera picture, in the case of the corresponding embodiment of the landmark, is clearly connected with the wanted angle. According to exemplary embodiments of the present invention, the nature of the landmark is such that precisely one such bar occurs which has a brightness that is increased with respect to the surrounding areas and/or precisely one such bar occurs which has a brightness that is reduced with respect to the surrounding areas.

In order to create lighting conditions which promote a reliable and precise operating mode of a system according to the invention, the sensor system of a system according to the invention may include its own light source and/or is suitable for activating at least one vehicle head light.

In a system according to the invention, the sensor system and the analyzing unit may be provided as the only devices for determining the position and/or location of the motor vehicle relative to the target position, or further sensor systems may be contained in a system according to the invention which, as required, are provided additionally to the implementation of further functionalities.

The utilization of the at least one sensor system contained in a system according to the invention or of the additional sensor systems may, in each case, concern the planning of a collision-free drive from the current position to the target position and/or its monitoring with respect to the freedom from collision and/or a new planning during the implementation of a drive and/or the triggering of an automatic termination of such a drive or a report to the operator typically situated outside the motor vehicle. Several contained sensor systems are possibly utilized for tasks different from those mentioned above, or certain contained sensor systems are only utilized for some tasks of those mentioned above. In particular, the signals of at least one additional sensor system may be used for checking safety criteria. As an alternative or in addition, information of additional sensor systems can be analyzed in a system according to the invention in the sense of a sensor fusion or a plausibility check.

According to a further development of the present invention, parameters can be utilized when planning a collision-free drive which characterize the position and location of the second part of the sensor system with respect to the target position and/or which characterize the spatial relationships around the target position.

According to further development of the present invention, the sensor system of a system according to the invention has at least two second parts which are each assigned to a target position and are mounted close to this target position.

In particular, the at least two second parts of the sensor system may be constructed such that they can be differentiated from the first part of the sensor system. In this manner, various target positions can be differentiated, and parking operations can be planned and implemented for different target positions in different fashions. Correspondingly, several sets of parameters may be filed in a system according to the invention, which sets each characterize the position and location of a second part of the sensor system with respect to a pertaining target position and/or spatial relationships around a pertaining target position.

By means of the attached drawings, an exemplary embodiment of the invention will be further explained in detail in the following.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic view of the visual appearance image of a passive visual artificial landmark for different angles of view under identical light conditions, used according to an exemplary embodiment of the invention; and FIG. 4 is a schematic view of the visual appearance image of an alternative embodiment of a passive visual artificial landmark for different viewing angles under identical light conditions.

DETAILED DESCRIPTION OF THE DRAWINGS

Figure 1:
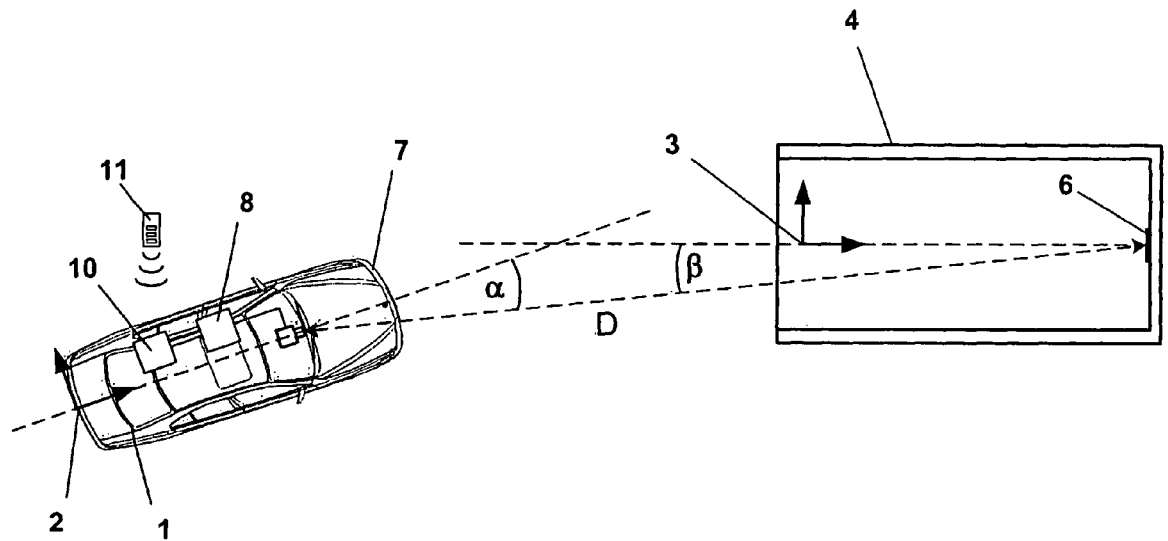
FIG. 1 is a schematic view of the geometrical quantities, which can be determined by a system according to the invention, and of the spatial relationships between a motor vehicle to be moved autonomously into a target position, here, a central parking position within a garage parking space, and the target position.

A motor vehicle 1 is to be autonomously brought from a starting position 2 into a target position 3, i.e., a central parking position within a garage parking space 4. FIG. 1 is a schematic view of the initially existing spatial relationships when the motor vehicle 1 is in the starting position 2.

The autonomous parking operation is aided by a sensor system. The sensor system includes, as a first part, a camera mounted at the motor vehicle 1 in a defined position and location, and a passive visual artificial landmark 6 mounted on the wall of the garage parking space 4 in a defined position and location.

The camera 5 is oriented such that the camera axis extends parallel to the longitudinal axis of the vehicle.

The passive visual artificial landmark 6 consists of a 3D reflector having a direction-dependent reflection behavior, having a flat rectangular shape and being mounted horizontally in the center and at a right angle with respect to the center axis of the garage.

The landmark 6 is mounted in such a spatial location on the wall of the garage parking space 4 that it has a horizontally variable reflection behavior.

Figure 2:
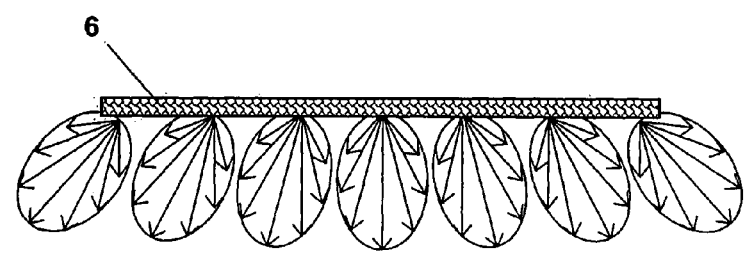
FIG. 2 is a schematic view of the reflection characteristics of a passive visual artificial landmark used according to an exemplary embodiment of the invention.

FIG. 2 illustrates the reflection characteristics of the landmark 6. FIG. 2 is a top view of the landmark 6 and shows various horizontally identically distributed bundles of reflection arrows, which each visualize the reflection behavior applying to a horizontal section of the landmark 6. The length of each reflection arrow corresponds to the degree of reflection in the direction of the respective reflection arrow. A landmark according to FIG. 2 therefore has a visual appearance image which depends on the horizontal viewing angle.

FIG. 3 is the visual appearance image of such a landmark for different viewing angles under identical light conditions, in the case of an essentially uniform light incidence. FIG. 3a shows the visual appearance image of the landmark when viewed from the left. FIG. 3b shows the visual appearance image of the landmark when viewed from the center. FIG. 3c shows the visual appearance image of the landmark when viewed from the right. Depending on the viewing angle, an area essentially having the shape of a vertically extending bar is situated in a different horizontal position within the image of the landmark in the camera picture, which area has a brightness that is increased in comparison to the surrounding areas.

FIG. 4 is the visual appearance image of an alternative embodiment of such a landmark for different viewing angles under identical light conditions, in the case of an essentially uniform light incidence. FIG. 4a shows the visual appearance image of the alternative embodiment of a landmark when viewed from the left. FIG. 4b shows the visual appearance image of the landmark of the alternative embodiment of a landmark when viewed from the center. FIG. 4c shows the visual appearance image of the alternative embodiment of a landmark when viewed from the right. Depending on the viewing angle, an area essentially having the shape of a vertically extending bar is situated in a different horizontal position within the image of the landmark in the camera picture, which area has a brightness that is reduced in comparison to the surrounding areas.

Vertically, the landmark 6 is mounted at the garage parking space 4 approximately at medium height between the height of the mounting of the camera 5 at the motor vehicle and the height of the high beam light 7 of the motor vehicle. When the high beam lights 7 are switched on, an essentially uniform light incidence on the landmark 6 takes place there.

The motor vehicle has a control unit 10 for planning or for controlling the planning of automatic parking operations and for controlling the implementation of these automatic parking operations. By means of a remote control 11, which communicates with the control unit 10, an automatic parking operation can be triggered or controlled by an operator.

The high beam lights 7 of the motor vehicle 1 can be activated by the control unit 10 and are activated during the planning and implementation of a parking operation to promote an exact and reliable function of the image-processing-based sensors.

The camera 5 takes pictures at a sufficient horizontal camera aperture angle. The camera pictures taken by the camera 5 are analyzed by an analyzing unit 8. The analyzing unit may be completely or partially identical with the control unit 10. Both can be additionally usable for different functionalities of the motor vehicle.

For planning an automatic parking operation, the analyzing unit 8 first detects the presence of the landmark in the camera picture by means of the approximately rectangular shape of its image. In order to be able to reliably carry out this detection independently of distortions of the image in the camera picture, the motor vehicle has to be situated approximately frontally in front of the garage parking space 4. Otherwise, as a remedy or for making the detection operation more reliable, further characteristics of the landmark or of its image in the camera picture (such as color, brightness) can be taken into account. At least a visual contact has to exist between the camera and the landmark. For reasons of safety, a plausibility check will be carried out at a later point in time.

After the detection of the landmark 6, the following determinations of geometrical quantities will be carried out by means of the pictures of the camera 5:

The distance D between a reference point, here, the lens center, of the camera 5, and a reference point, here, the surface center, of the landmark 6 is determined from the reduction factor of the image of the landmark 6 in the taken camera picture.

The horizontal angle $\alpha$ between the camera axis and the connection axis between the lens center of the camera 5 and the surface center of the landmark 6 is determined by means of the center of mass location of the image of the landmark 9 in the taken camera picture.

The horizontal angle $\beta$ between the center axis of the garage and the connection axis between the lens center of the camera 5 and the surface center of the landmark 6 is determined by means of characteristics, particularly brightness characteristics, of the image of the landmark 6 in the taken camera picture. In this case, the course of the brightness within the image of the landmark 6 in the camera picture is analyzed. The blaze of the high beam light 7 causes an easily detectable, vertically extending bar of high brightness in the camera picture within the image of the landmark 6. The lateral position of the vertical bar of high brightness within the image of the landmark 6 can be determined in a manner known per se by the use of an image processing method by means of the analyzing unit 8. From the lateral position, in turn, the wanted angle $\beta$ is determined, whose value is clearly connected with the lateral position of the vertical bar.

For ensuring the correct detection of the above-mentioned geometrical quantities, the analyzing unit subsequently carries out a plausibility check with respect to the distortion of the rectangular shape of the landmark and at least of one of the determined geometrical quantities.

By means of the determined quantities, for example, the analyzing unit 8 can clearly determine the spatial location and location of the motor vehicle 1 relative to the target position 3. As a function of this relative position and location, by means of the control unit 10, in a manner known per se, a collision-free drive can be planned from the current position to the target position. When planning the collision-free drive, the control unit 10 utilizes parameters filed there, which characterize the spatial relationships around the target position 3, particularly the dimensions of the garage parking space 4, and/or the position and location of the landmark with respect to the target position 3.

By means of devices for implementing the planned drive, this drive can be carried out in a manner known per se. In this case, the devices for implementing the planned drive can be controlled by the control unit 10 which, according to the present embodiment, acts upon the motor vehicle 1 by means of the following interventions:

Engine start and stop
gear selection
steering intervention, hydraulically or by an electric motor
braking intervention
locking and unlocking of doors
monitoring of the surroundings for avoiding collisions by means of ultrasound-based parking distance control sensors
activating of the high beam lights 7
activating of the emergency flasher lights of the motor vehicle 1 for warning traffic participants and/or passengers situated in the surroundings.

The parking operation, which takes place autonomously in the described manner, can be triggered or controlled by means of the remote control 11 by an operator situated outside the motor vehicle 1. The remote control 11 may simultaneously be provided for the locking and unlocking of the motor vehicle 1. Typically, a first operating action of the operator triggers the self-localization of the motor vehicle 1 with respect to the target position 3 and the planning of a collision-free drive. A second operating action triggers the implementation of the drive. In particular, the first operating action of the operator may consist of a single or repeated locking action. The second operating action typically consists of a lasting key pressure at the remote control 11. A termination of the lasting key pressure typically results in an immediate termination of the implementation of the planned drive. The operator can thereby terminate the drive without delay in the event of safety concerns, in the case of an accidental operation of the remote control or in the event of a rapid change of mind with respect to the further use of the motor vehicle 1.

According to an alternative embodiment of the invention, pictures taken by the camera 5 are continuously searched for the presence of the landmark or of a comparable landmark, and the system according to the invention, particularly the control unit 10, automatically carries out the planning of a collision-free drive for an automatic parking operation as soon as such a landmark is detected. The first operating action of the operator can thereby be eliminated.

During the implementation of a planned drive, the distance D as well as the two angles $\alpha$ and $\beta$ are determined, as required, repeatedly in the described manner. The current position and location of the motor vehicle 1 can thereby be coordinated with the position and location expected according to the planned drive. Unexpected deviations lead to the termination of the planned drive by the control unit 10.

The detection of unexpected obstacles by the monitoring of the environment of the motor vehicle 1 also results in the termination of the implementation of the planned drive by the control unit 10.

According to an exemplary embodiment of the invention, a system according to the invention includes at least one additional landmark which is not illustrated here. The additional landmark is assigned to a target position not illustrated here and is mounted close to the latter.

According to a first embodiment derived therefrom, both landmarks contained in the system according to the invention have an approximately identical construction, and, by means of the system according to the invention, comparable parking operations can be planned and implemented for both target positions.

According to a second embodiment derived therefrom, the two landmarks, which are mounted close to different target positions, are of a different nature (for example, with respect to their shape), and their images in the camera picture can be differentiated by the analyzing unit 8. The system according to the invention is therefore capable of differentiating between the different target positions and of taking into account, for example, different spatial relationships in the environment of the target positions when planning and implementing an automatic parking operation. For this purpose, a set of parameters is filed in the motor vehicle 1, particularly in the control unit 10, for each target position, which parameters characterize the spatial relationships around the respective target position and the position and location of the respective landmark with respect to the respective target position.

The above statements relate predominantly to park-in operations which can be carried out automatically in a driverless manner. A system according to the invention can also be used in a comparable manner for the planning, implementation and monitoring of a park-out operation, particularly if the latter follows a park-in operation carried out by the system according to the invention.

In addition to the driverless implementation of parking operations in the case of motor vehicles, the invention can analogously be applied to operations of other locomotion devices similar to parking operations. For example, an automatic docking of a ship can be implemented by means of a system according to the invention in a defined position and location with respect to a quay wall. Likewise, by means of the system according to the invention, the automatic docking of an airplane can be implemented in a defined position and location with respect to an airport terminal. In that case, the first part of a sensor system contained in a system according to the invention is to be mounted on the ship or on the airplane, and a second part is to be mounted on the quay wall or on the airport terminal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for automatically bringing a motor vehicle into a target position, comprising:
   a sensor system;
   an analyzing unit for determining the position of the motor vehicle relative to the target position;
   a device for planning a collision-free drive from the current position to the target position; and
   a device for autonomously implementing the collision-free drive from the current position to the target position in a driverless manner,
   wherein a first part of the sensor system is arranged at or in the motor vehicle, and a second part of the sensor system is arranged in a stationary manner in a defined position close to the target position.

2. The system according to claim 1, wherein:
   the first part of the sensor system is arranged in a defined spatial location with respect to the motor vehicle; and
   the sensor system and the analyzing unit are suitable for determining the horizontal angle between a reference axis of the first part of the sensor system, particularly the longitudinal vehicle axis, and a connection axis between a reference point of the first part and a reference point of the second part of the sensor system.

3. A system according to claim 2, wherein:
   the second part of the sensor system is arranged in a defined spatial location with respect to the target position, and
   the sensor system and the analyzing unit are suitable for determining the horizontal angle between a garage center reference axis of the second part of the sensor system and a connection axis between a reference point of the first part of the sensor system and a reference point of the second part.

4. The system according to claim 2, wherein the sensor system and the analyzing unit are suitable for determining the distance between a reference point of the first part of the sensor system and a reference point of the second part of the sensor system.

5. The system according to claim 2, wherein the second part of the sensor system includes at least one artificial landmark.

6. The system according to claim 2, wherein the second part of the sensor system consists of an artificial landmark.

7. A system according to claim 1, wherein:
   the second part of the sensor system is arranged in a defined spatial location with respect to the target position, and
   the sensor system and the analyzing unit are suitable for determining the horizontal angle between a garage center reference axis of the second part of the sensor system and a connection axis between a reference point of the first part of the sensor system and a reference point of the second part.

8. The system according to claim 7, wherein the sensor system and the analyzing unit are suitable for determining the distance between a reference point of the first part of the sensor system and a reference point of the second part of the sensor system.

9. The system according to claim 7, wherein the second part of the sensor system includes at least one artificial landmark.

10. The system according to claim 7, wherein the second part of the sensor system consists of an artificial landmark.

11. The system according to claim 1, wherein the sensor system and the analyzing unit are suitable for determining the distance between a reference point of the first part of the sensor system and a reference point of the second part of the sensor system.

12. The system according to claim 11, wherein the second part of the sensor system includes at least one artificial landmark.

13. The system according to claim 1, wherein the second part of the sensor system includes at least one artificial landmark.

14. The system according to claim 13, wherein the artificial landmark is constructed as a passive visual artificial landmark suitable for the direction-dependent reflection of incident light.

15. The system according to claim 14, wherein the passive visual artificial landmark is of such a nature or is spatially arranged to be suitable for the horizontally variable reflection of incident light, the passive visual artificial landmark has a lenticular image, or the passive visual artificial landmark is based on a lamellar construction having lamellae of a variable adjusting angle.

16. The system according to claim 1, wherein the second part of the sensor system consists of an artificial landmark.

17. The system according to claim 16, wherein the artificial landmark is constructed as a passive visual artificial landmark suitable for the direction-dependent reflection of incident light.

18. The system according to claim 1, wherein the second part of the sensor system comprises a camera which can be utilized by at least one additional functionality of the motor vehicle.

19. The system according to claim 1, wherein the sensor system comprises a light source or the sensor system is suitable for activating at least one vehicle headlight.

20. A method for automatically bringing a motor vehicle into a target position, comprising the acts of:
- determining a position of the motor vehicle relative to the target position via a sensor system and an analyzing unit;
- planning a collision-free drive from the current position to the target position; and
- autonomously controlling the motor vehicle to follow the collision-free drive from the current position to the target position in a driverless manner,
- wherein a first part of the sensor system is arranged at or in the motor vehicle, and a second part of the sensor system is arranged in a stationary manner in a defined position close to the target position.

* * * * *